April 19, 1966 P. SISKIND 3,247,448

MULTIPLE FREQUENCY OSCILLATOR

Filed Sept. 28, 1961 4 Sheets-Sheet 1

INVENTOR.
PHILIP SISKIND
BY
[signature]
ATTORNEY

April 19, 1966 P. SISKIND 3,247,448

MULTIPLE FREQUENCY OSCILLATOR

Filed Sept. 28, 1961 4 Sheets-Sheet 2

INVENTOR.
PHILIP SISKIND
BY
ATTORNEY

MULTIPLE FREQUENCY OSCILLATOR

Filed Sept. 28, 1961 4 Sheets-Sheet 3

INVENTOR.
PHILIP SISKIND
BY
[signature]
ATTORNEY

MULTIPLE FREQUENCY OSCILLATOR

Filed Sept. 28, 1961 4 Sheets-Sheet 4

INVENTOR.
PHILIP SISKIND
BY
[signature]
ATTORNEY

United States Patent Office 3,247,448
Patented Apr. 19, 1966

3,247,448

MULTIPLE FREQUENCY OSCILLATOR

Philip Siskind, Great Neck, N.Y., assignor to Sperry Rand Corporation, Great Neck, N.Y., a corporation of Delaware Filed Sept. 28, 1961, Ser. No. 141,351
9 Claims. (Cl. 321—68)

This invention relates to frequency converters of the magnetic core type.

Many control system applications require the production of accurate square wave signals from a source of direct current. These signals are useful in such components as modulators, demodulators, timing and switching circuits. Sometimes, in addition to a fundamental signal, it is desirable to provide other signals which are related to the fundamental either in phase or in frequency. Examples of this are seen in certain magnetic demodulator circuits where the provision of a signal of the second harmonic enhances the accuracy of the device and where the provision of a phase related signal is useful in quadrature rejection.

Frequency conversion may be accomplished either mechanically, as by rotating or vibrating machinery, or electrically, as by means of saturable core devices. The former approach is generally limited to a certain maximum frequency and wear on moving parts severely limits the useful life of the device. Patent No. 2,783,380 to T. H. Bonn and assigned to the assignee of the present invention describes a frequency converter of the latter type. In that device a single transformer core is magnetized in one direction until it saturates. At the point of saturation a pair of transistor elements are switched to drive current through windings to magnetize the core in the opposite direction until it again saturates, whereupon the transistor elements are again switched. The core is provided with an output winding for converting changes in magnetization of the core to useful output voltages.

The known electrical frequency converters are suited to much higher frequencies and longer life than their mechanical counterparts. However, they are generally capable of providing only a single output signal at any given time. Also their rather high load sensitivity makes it impractical in many cases to connect conventional highly inductive frequency doubling circuits to the output.

Consequently, it is an object of this invention to provide an improved means for converting a direct current to alternating signals having desired characteristics.

It is another object to provide a means for producing a plurality of synchronously related signals from a direct current source.

Another object is to produce a multiplicity of alternating signals which are harmonically related in frequency.

Another object is to produce a multiplicity of alternating signals which are related in phase.

A further object is to produce said signals with no moving parts and with a minimum of equipment.

A still further object is to maintain the accuracy of said signals over a greater loading variation than was heretofore possible.

These and other objects are realized in the following manner. A number of saturable magnetic cores having substantially identical characteristics are initially biased to discrete points of magnetization. A forward and a reverse driver circuit, both of which comprise serially connected windings on each core, are connected across a direct current supply. Switching means such as transistors are provided in each of the driver circuits to alternately complete each circuit as certain cores attain prescribed degrees of magnetization. These bias magnetization points are chosen so that during the time each circuit is completed each core is successively driven through its entire nonsaturated state. Output signals are taken from serially connected output windings on each core.

More specific forms of the invention utilize the changing magnetic flux of the nonsaturated core to generate potentials for maintaining the driver circuit switches in their conducting or nonconducting states and to cause switching when every core becomes saturated in given directions. Fundamental and harmonic signals are obtained by selectively arranging the output winding circuits in individual additive and subtractive combinations. Phase displaced fundamental outputs are obtained by rectifying the output potentials of the cores which cause switching of the driver circuits and by combining these rectified outputs with output potentials generated at the other cores in various additive and subtractive combinations.

Referring now to the figures.

Figure 1:
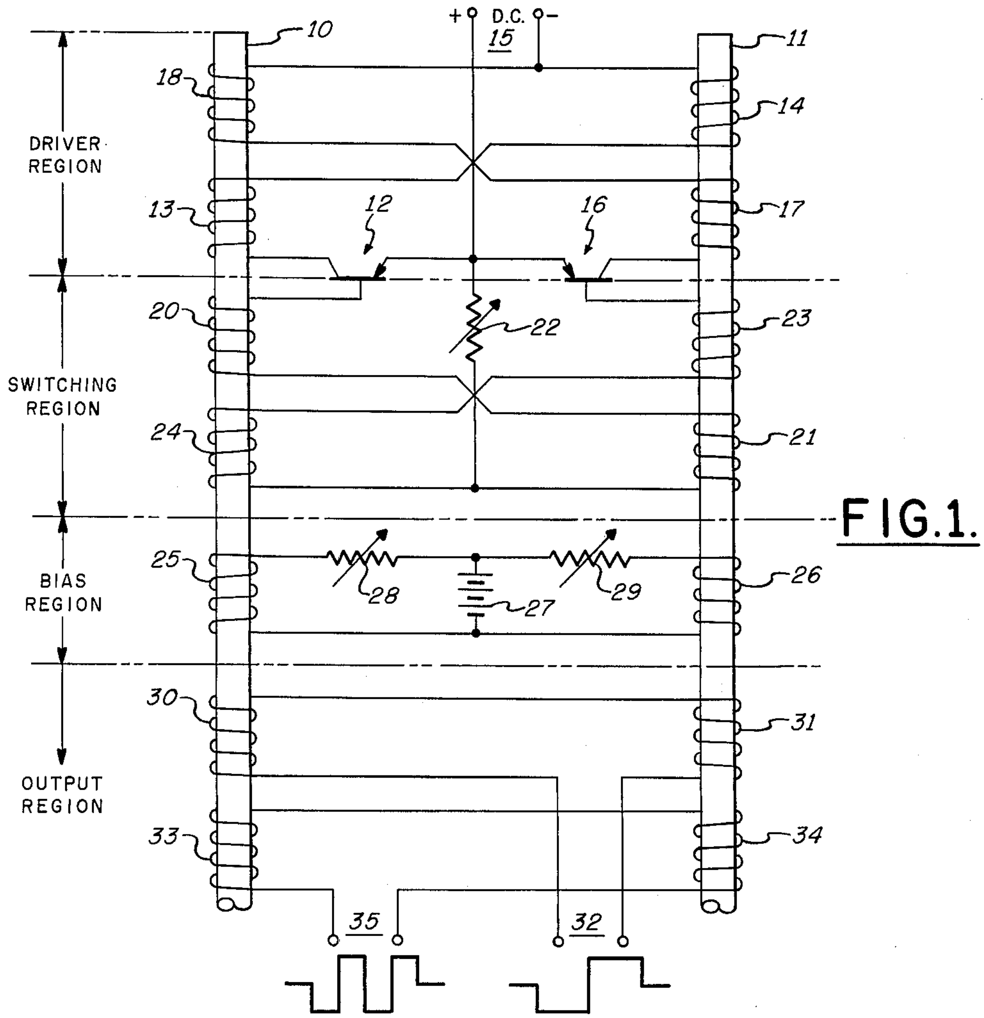
FIG. 1 is a schematic diagram illustrating one embodiment of the present invention.

FIG. 1 shows a two-core frequency converter which operates according to the principles of the present invention to simultaneously produce fundamental and second harmonic square wave signals from a D.C. supply. The device comprises first and second saturable magnetic cores 10 and 11, which contain a multiplicity of windings connected to various circuits to be described. The cores may be of any conventional magnetic material having well-defined saturation points selected in accordance with the frequency and amplitude of the desired output signals. The cores are shown in the form of iron rods for purposes of illustration only, and in a practical system would preferably take the form of toroids.

The windings on each core and associated circuits are arranged into regions known as the driver region, the switching region, the bias region, and the output region. These regions are defined by the phantom lines in the drawing.

The driver region of the device is composed of a forward drive circuit and a reverse drive circuit. The forward drive circuit includes a forward transistor switch 12, a first core forward driver winding 13 and a second core forward driver winding 14 all serially connected across a source of direct current 15. The reverse driver circuit includes a reverse transistor switch 16, a second core reverse driver winding 17 and a first core reverse driver winding 18 also serially conected across the D.C. source 15. The driver windings have equal numbers of turns and are arranged in such a manner that current flowing in the forward driver circuit causes the magnetization of each core to increase in the upward direction while current flowing in the reverse driver circuit causes the magnetization of each core to increase in the downward direction.

The switching region of the device comprises forward and reverse switching circuits. The forward switching circuit includes a forward switch winding 20 on the first core, a forward switch winding 21 on the second core and a resistance element 22 all serially connected between the base and emitter of the forward transistor switch 12. The reverse switching circuit includes a reverse switch winding 23 on the second core, a reverse switch winding 24 on the first core and the resistance element 22 serially connected between the base and emitter of the reverse transistor switch. The coils in the forward switching circuit are so wound that the magnetic flux resulting from an increase in magnetization in the upward direction in either core will produce a sufficient base to emitter potential in the forward transistor switch to maintain a full flow of current in that circuit. However, when neither core provides a changing magnetic flux in the upward direction, the base to emitter potential will drop beyond the cutoff point and current will cease to flow in the forward driving circuit. The windings of the reverse switching circuit are arranged in such a manner that changing magnetic flux resulting from changes in magnetization of either core in the downward direction will produce a sufficient base to emitter difference in potential in the reverse transistor switch to maintain a full flow of current through that circuit.

It is to be noted that although transistors have been found to provide the best results for general application, any of a number of other current or voltage responsive switching means may be used in their place. For example, voltage sensitive relays may have their contacts connected into the respective driver circuits and their solenoidal windings connected to the outputs of the serially connected switching windings.

The bias region of the device comprises bias windings 25 and 26 on each core which are connected in parallel across a source of direct current 27. Variable resistances 28 and 29 are provided in series with each bias winding in order to adjust the initial magnetization points of the device. The windings and resistances are so arranged that they will magnetize the first core 10 to the saturation point in the downward direction and the second core 11 to its saturation point in the upward direction.

The output region of the device includes a fundamental wave output circuit and a second harmonic wave output circuit. The fundamental circuit comprises windings 30 and 31 on each core which are serially connected in additive fashion between a pair of output terminals 32 designated as the fundamental output terminals. These windings are arranged additively; that is, the change in flux resulting from an increase in magnetization in the upward direction in the first core and in the downward direction in the second core will produce the same sense of voltage across the fundamental output terminals. The second harmonic output circuit includes a further pair of output windings 33 and 34 on each core which are serially connected across a second paid of output terminals 35 designated as the second harmonic output terminals. These windings are arranged substractively, so that an increase in magnetic flux in both cores in the upward direction will produce the same direction and voltage across the output terminals.

During operation of the device the forward and the reverse driver circuits conduct alternately. Operation is initiated when some slight unbalance in the device permits a small amount of current to flow in one of the circuits, which for purposes of this explanation will be assumed to be the forward driver circuit. This initial current flow through the forward driver windings 13 and 14 tends to increase the magnetization of both cores by equal amounts in the upward direction. Because the second core 11 is already magnetized to saturation in this direction, no resulting change in magnetic flux occurs as it is driven further into saturation, and no voltages are induced across any of its windings. In the first core 10, however, a corresponding change in magnetic flux will be produced as the core tends to be driven out of saturation. This change in flux produces a potential across its forward switch winding 20 which in turn increases the base to emitter potential of the forward transistor switch 12 to such an extent that it is rendered to a full conducting condition. The initial change in magnetic flux produced in the first core 10 also initiates a potential across the reverse driver circuit switch winding 24, which maintains the second transistor switch 16 in a nonconducting condition.

With the forward driver circuit thus connected and the reverse driver circuit broken, a steadily increasing current, limited only by the impedance of the first core forward driver winding 13, will flow in the forward circuit.

This increasing current will steadily increase the upward magnetizing force of both cores, and the consequent change in flux produced in the first core 10 induces sufficient potentials on its switch windings to maintain the exclusive operation of the forward driver circuit. The upwardly changing magnetic flux produced in this core also induces potentials across its output windings 30 and 33 which are combined at the output terminals in a manner to be described.

Operation in this manner continues until the first core 10 also becomes saturated in the upward direction. At this point the increase of magnetic flux produced in the first core ceases, thus removing the potentials from the transistor switches. The amount of current flowing in the forward circuit consequently decreases slightly. The decrease in current is accompanied by corresponding downward changes in the magnetizing force applied to both cores and the magnetic flux of the first core. The effect of this is to generate reverse potentials on the first core switch windings 20 and 24 which will bias the forward transistor switch 12 to a nonconducting condition and the reverse transistor switch 16 to a conducting condition. Current then flows through the reverse driver circuit, changing the magnetization of both cores by equal amounts in the downward direction.

During the first half of the downward portion of the cycle, the increasing current in the reverse driver circuit is limited solely by the impedance of the reverse driver winding 18 on the nonsaturated first core 10. When this core becomes saturated in the downward direction, the second core 11 reaches its upward saturation point. Current continues to increase in the reverse driver circuit while now being limited by the impedance of the reverse driver winding 17 on the second core 11 as that core is driven out of saturation in the downward direction. The accompanying downward change in magnetic flux produced in the second core also maintains sufficient potentials on its switch windings 21 and 23 to keep the forward transistor switch 12 in a nonconducting state and the reverse transistor switch 16 in its full conducting state. Current continues to increase in the reverse driver circuit until the second core 11 also attains saturation in the downward direction, whereupon a reversal similar to that previously described takes place.

Figure 2:
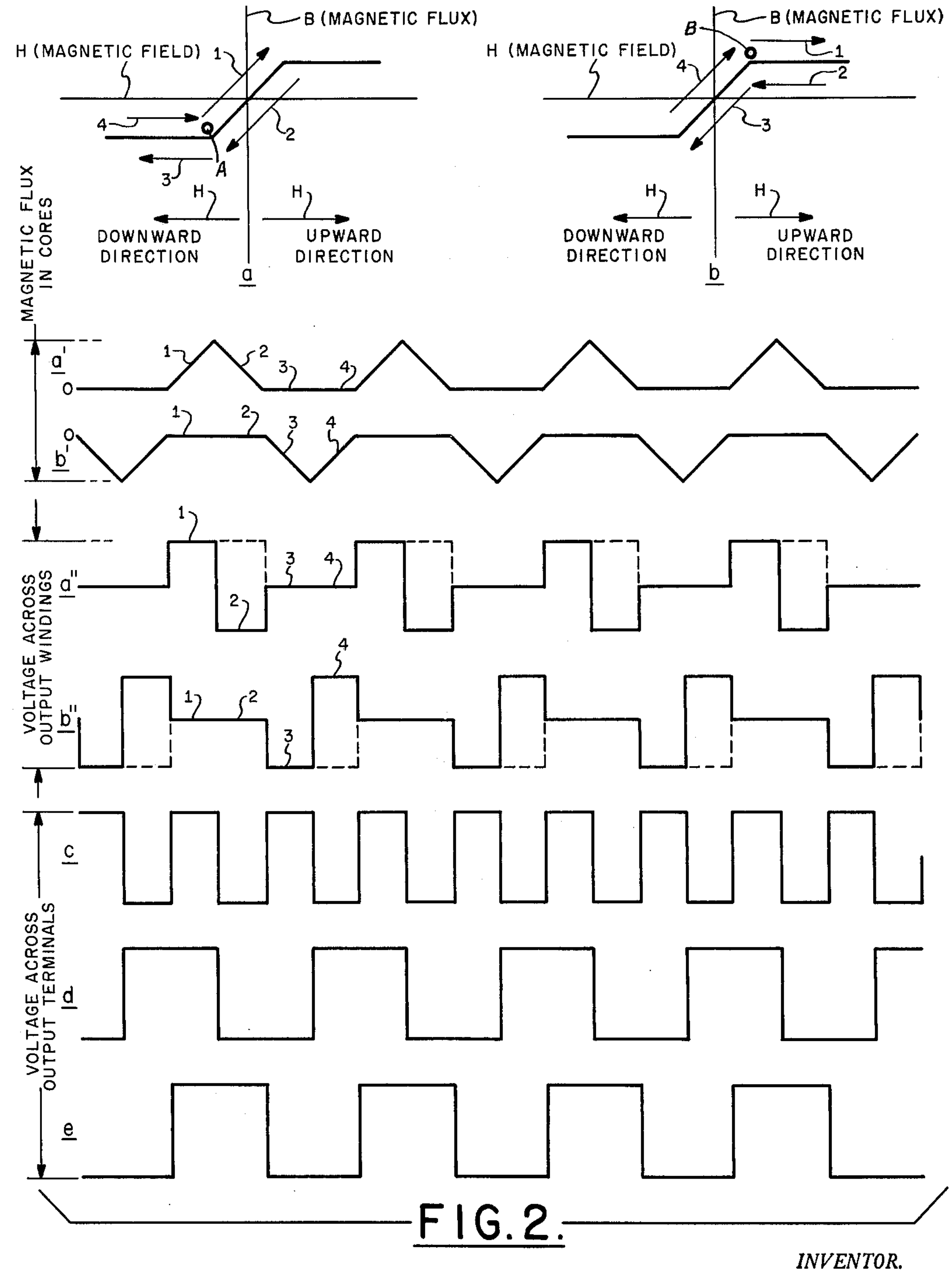
FIG. 2 is a series of waveforms useful in understanding the embodiment of FIG. 1.

The effect of this operation on the output circuit may be seen more easily by reference to FIG. 2. Curves *a* and *b* of FIG. 2 are idealized B-H diagrams of the two magnetic cores. The first core 10 is seen to be initially biased to point A of the first diagram *a* while the second core is seen to be initially biased to point B of the second diagram *b*. With the forward driver circuit in full operation, the magnetizing force applied to both cores increases simultaneously and by equal amounts in the upward direction. It can be seen that the magnetic flux in the first core increases in the upward direction during this portion of the cycle but that the magnetic flux in the second core does not change significantly. When the first core reaches saturation in the upward direction, switching will take place as described previously and the magnetization of both cores will be changed in the downward direction. The magnetic flux developed in the first core then changes in the downward direction, while again no change in magnetic flux is produced in the second core. At the time the first core becomes saturated in the downward direction however, a downward change in magnetic flux will be experienced by the second core which by reason of its switch windings will produce sufficient potentials to maintain the reverse circuit in operation even though no change in flux is undergone by the first core. This operation continues until both cores become saturated in the downward direction whereupon switching to the forward circuit takes place.

Curves $a'$ and $b'$ are plots of magnetic flux experienced by each core over the various portions of the cycle. It can be seen that the first core experiences first an upward then a downward change in magnetic flux during the time the second core is magnetically saturated while the second core experiences first a downward and then an upward change in magnetic flux during the time the first core is saturated. These changes in magnetic flux produce voltages across their respective output windings as shown in the solid portions of the curves $a''$ and $b''$.

The second harmonic windings are arranged to subtractively combine these voltages to produce the curve shown at *c* terminals. The fundamental windings additively combine the voltages developed on them to produce the curve shown at *d* across its output terminals. It is to be noted that the curves *c* and *d* represent square wave voltages which are harmonically related and which are maintained in exact phase synchronism irrespective of any frequency variation which may be undergone by the system.

The curve shown in *e* of FIG. 2 is seen to be a second fundamental square wave which has been shifted by 90° from the original fundamental wave. This type of output is accomplished by rectifying the outputs of the windings of each of the cores in a manner shown by the dotted lines of the curves $a''$ and $b''$. When these outputs are combined in an additive fashion, the phase shifted fundamental frequency is produced.

Figure 3:
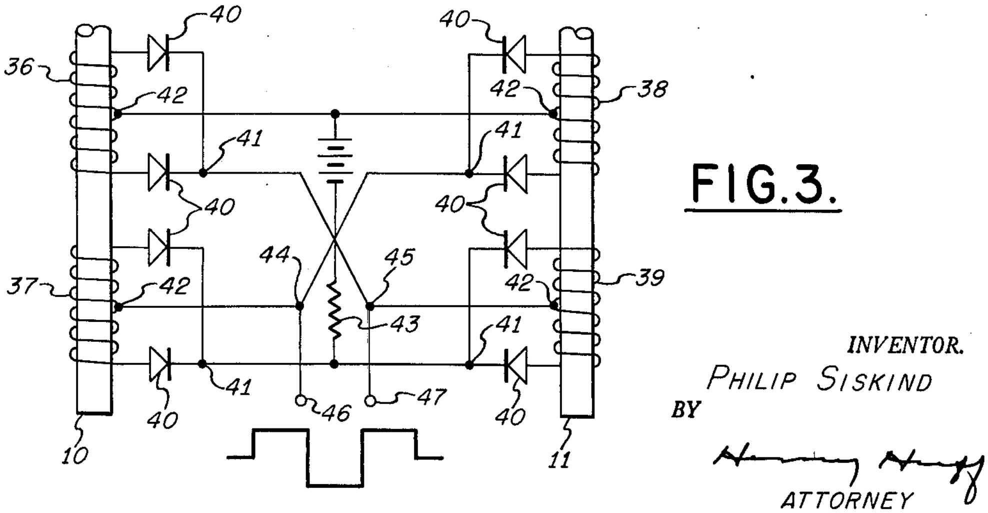
FIG. 3 is a schematic diagram illustrating an additional modification of the embodiment of FIG. 1.

The rectifying and combining circuits for producing the phase shifted fundamental output are shown in FIG. 3. The cores 10 and 11 are extensions of the cores of FIG. 1 and the windings are part of the output region of these cores. This portion of the output region is seen to comprise two center tapped full wave rectifying windings on each core, the windings on the first core 10 being designated as 36 and 37 respectively and those on the second core 11 being designated as 38 and 39. Each winding has diodes 40 connected to its ends and the diode outputs are combined at one terminal 41 while the center tap forms the other terminal 42. Because of this arrangement each winding will produce a more positive voltage at its end terminal than at its center tap terminal whenever its respective core undergoes a change in magnetic flux, irrespective of the direction of the change. The rectification properties of the winding arrangements, permits current to flow in only one direction between the winding terminals. This prohibits a direct series conection of the terminals of windings from each core to be made between a pair of output terminals, and makes necessary a bridge type circuit arrangement such as that of FIG. 3. The circuit comprises four arms with the full wave rectifying windings of each core connected in mutually opposite arms. A bridge resistance 43 is diagonally connected across the circuit in one direction while intermediate terminals 44 and 45 are located diagonally across the circuit in the other direction. The orientation of the windings in the bridge is such that the center tap terminal of the upper winding 36 on the first core 10 is connected to the upper end of the bridge resistance 43 while the end terminal of the lower winding 37 of the first core is connected to the lower end of the bridge resistance. The other terminals of the first core windings are connected to opposite intermediate terminals. The center tap terminal of the upper winding 38 on the second core 11 is also coupled to the upper end of the bridge resistance 43 and the end terminal of the lower winding 39 of the second core is connected to the lower end of the bridge resistance. The remaining terminals of the second core windings are also connected to opposite intermediate terminals to complete the bridge circuit. The intermediate terminals are connected to corresponding output terminals 46 and 47.

When the first core 10 undergoes changes in magnetic flux in either the upward or the downward direction, the end terminals 41 of its two windings 36 and 37 become positive with respect to the center tap terminals 42. No voltage is generated between the terminals of the other windings 38 and 39 although they each retain their unidirectionally conductive characteristic. Because of the potentials developed in the first core windings, current tends to flow in two separate loops, the one comprising the upper first core winding 36, the lower second core winding 39 and the bridge resistance 43; and the other loop comprising the lower first core winding 37, the upper second core winding 38 and again the bridge resistance 43. When the second core 11 undergoes changes in magnetic flux, the induced voltages on the second core windings 38 and 39 produce similar currents in these two loops. It is to be noted, however, that in the first case, i.e., with the first core 10 producing changes in magnetic flux, the first output terminal 44 is at the more negative side of a potential producing winding while the second output terminal 45 is at the more positive side of a potential producing winding. When the second core produces changes in magnetic flux the first output terminal 44 is at the more positive side of a potential producing winding and the second output terminal 45 is at the more negative side of a potential producing winding. Furthermore during the time that either core undergoes changes in magnetic flux a conductive path is provided between the output terminals through the two potential producing windings.

It can be seen that during operation of this portion of the output, current continually passes through the bridge resistance 43 in the same direction. For certain situations as where loading of the device may require large currents, this internal current may result in undesired reactances in the output windings. In order to prevent this a battery or similar source of potential is placed in series with the bridge resistance to counteract the flow of current. This reduces the resistance of the output windings without affecting the output characteristics.

Figure 4:
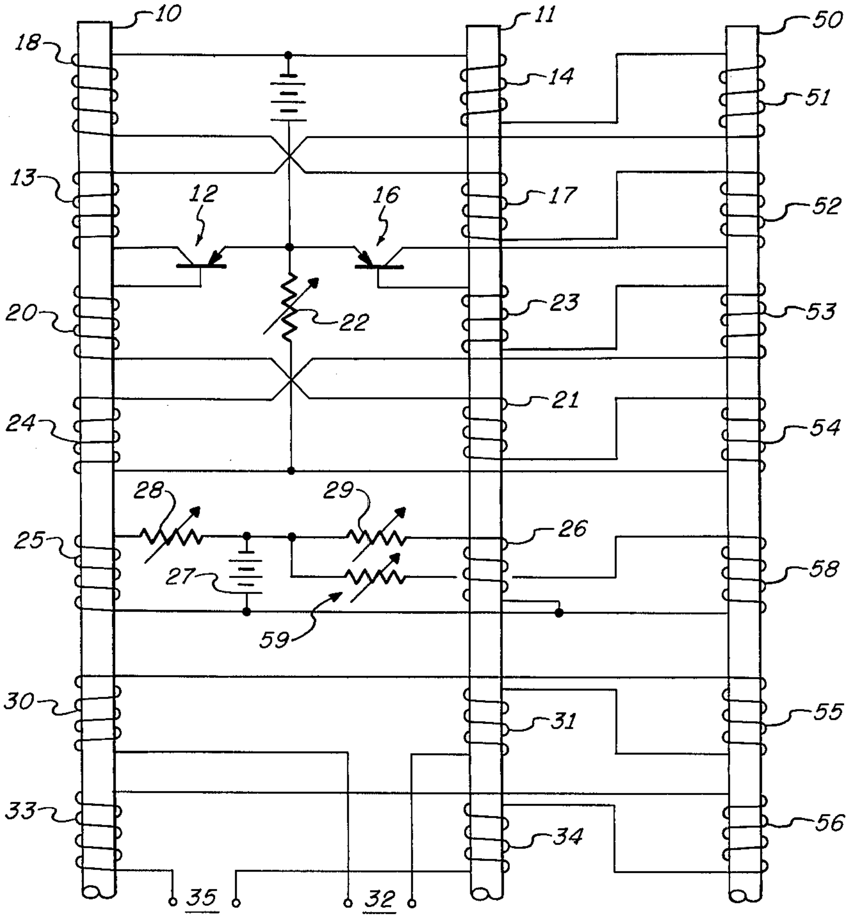
FIG. 4 is a schematic diagram illustrating a second embodiment of the invention.

A further embodiment of the invention is shown in FIG. 4. This device through the provision of a third core 50 produces a fundamental as well as a third harmonic frequency. The device is structurally similar to that of FIG. 1. The third core contains a number of windings 51–56 which are respectively connected in series with the driver, switching and output circuits of the first and second cores 10 and 11. A bias winding 58 is also provided in parallel with the bias windings on the first two cores and has an adjustable resistor 59 connected in series with it in order to establish a prescribed magnetic bias.

Figure 5:
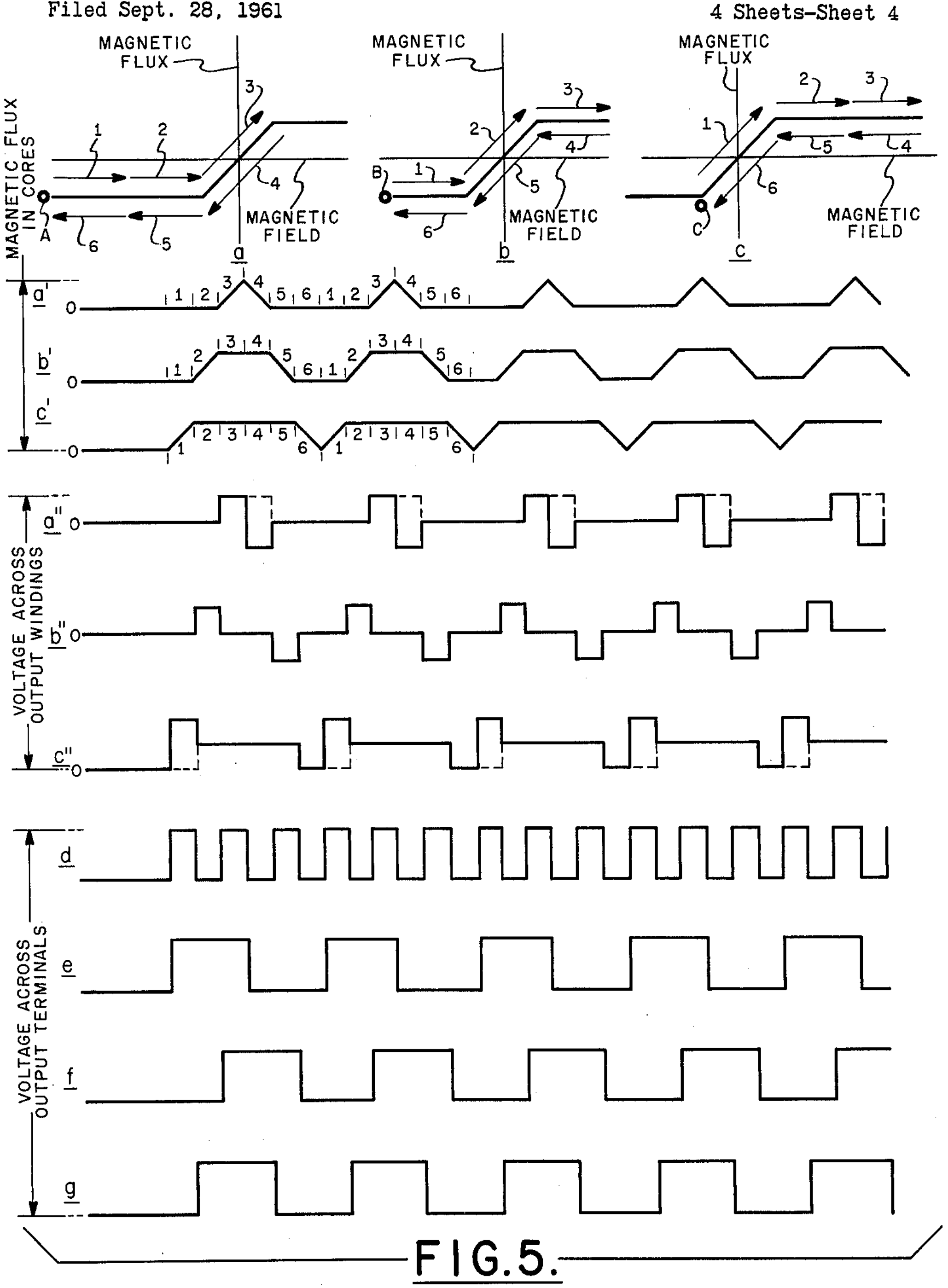
FIG. 5 is a series of waveforms useful in understanding the embodiment of FIG. 4.

The operation of this further embodiment may be more easily understood by reference to FIG. 5. Curves *a*, *b* and *c* of this figure represent idealized B–H characteristics of the three cores. The first core 10 is biased to point A of curve *a*. The second core 11 is biased to point B of curve *b* and the third core 50 is biased to point C of curve *c*. Operation will be assumed to commence with the forward driver circuit being completed and the reverse driver circuit broken. Each of the cores is magnetized by an equal amount in the upward direction with the third core 50 undergoing a change in magnetic flux as it is driven through its non-saturated region. The other two cores remain in their saturated states during this portion of the cycle and consequently experience no change in magnetic flux. The biases are arranged such that when the third core does become saturated in the upward direction the second core 11 will undergo a change in magnetic flux as it begins to be driven through its nonsaturated region in the upward direction. When the second core becomes saturated in its upward direction the first core 10 enters its nonsaturated region and experiences a change in magnetic flux until it also becomes saturated in the upward direction. At this point the potentials which sustained the forward driver circuit in operation are reversed and the reverse driver circuit begins to conduct. With the reverse driver circuit in operation the first core 10 undergoes a change in magnetic flux in the downward direction until it becomes saturated, whereupon the second core and then the third are successively driven through their nonsaturated regions.

The curves $a'$, $b'$ and $c'$ represent the time varying change of magnetic flux in each of the cores as they undergo their respective changes in magnetization. The effect of these changes in magnetic flux in creating potentials across the respective output windings are shown in the curves $a''$, $b''$ and $c''$. The output windings in the fundamental frequency output circuit are serially connected in such a manner that the voltages produced by the first, second and third cores are added. This produces the fundamental voltage represented by curve *e*. The third harmonic output circuit is connected in such a manner that the voltages from the first and third cores are added while that produced by the second core is subtracted, thus producing the third harmonic output represented by curve *d*.

The present embodiment may be adapted to provide the fundamental frequency at various increments of phase displacement. This is done by rectifying the voltage outputs of the first and second cores and combining these rectified voltage outputs in additive or subtractive manners with the voltages output from the third core. The effect of this rectification of additive and subtractive combination may be seen in curves *f* and *g* of FIG. 5.

Figure 6:
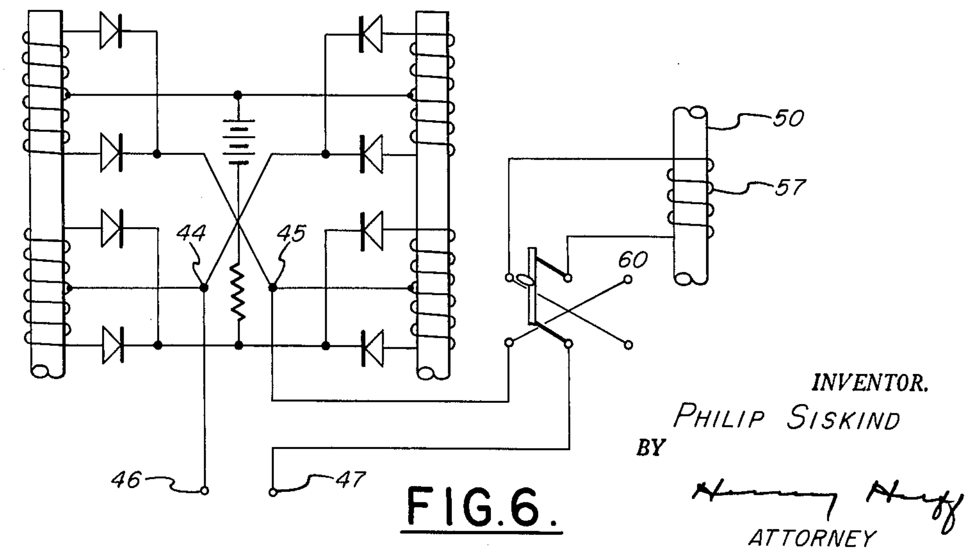
FIG. 6 is a schematic diagram illustrating an additional modification of the embodiment of FIG. 4.

The means by which the phase shifted output is produced is shown in FIG. 6. This device, like the structure of FIG. 3, is an extension of the output region of the main frequency generator. In FIG. 6 the first and second cores each are seen to contain two sets of center tapped full wave rectifying output windings in the bridge arrangement of FIG. 3. The third core 50 contains a conventional output winding 57 which is serially connected to the bridge circuit between one of the intermediate terminals and a corresponding output terminal. The potentials developed across this winding are combined with those produced by the bridge circuit in an additive or subtractive manner depending upon the particular connection. A double-pole-double-throw switch 60 may be provided to conveniently change the combination of voltages of the third core output winding from subtractive to additive or vice versa in order to change the phase displacement of the fundamental signal where it is not necessary to produce both signals simultaneously.

By utilizing the principles of the present invention the frequency capabilities of a magnetic core oscillator may be extended to any desired degree. For example, a fundamental frequency and any given harmonic may be produced with a number of cores equal to the desired harmonic and by providing these cores with windings which are serially connected in the driver, switch, and output circuits. Also each core should be initially biased to a discrete magnetization which differs algebraically from that of another core by an amount equal to twice the saturation magnetization of a core. Further, the initial magnetization of the last cores to become saturated while the respective driver circuits are in operation should differ from their respective switching saturation points by a total amount equal to twice the saturation magnetization of a core times the total number of cores. In this manner during the entire time each driver circuit is in operation each and every core will successively be driven through its entire nonsaturated state. Should it be desired to produce a lower harmonic with the same structure the initial magnetic bias on one of the last cores may be changed to a point equal to that of one of the intermediately biased cores and all cores encompassed by the change should be biased to remain in saturation continually. By means of this rearrangement of initial biasing the device is made to operate as though there were a fewer number of cores while the unused cores, being biased far into saturation, will have negligible effect on the operation of the device.

The principles of the present invention may also be employed to extend the phase displacement of a fundamental frequency to any of a number of possible amounts. This is accomplished by providing full wave rectifying output windings on the last core of each driver circuit, connecting the windings in a bridge type arrangement as previously described, and serially connecting the intermediate terminals of the bridge circuit with an output winding on each of the other cores. The phase displacement of the output may be adjusted by selectively reversing the connections to the output windings on the other cores so as to combine their induced potentials in an additive or subtractive manner.

While the invention is described in its preferred embodiments, it is to be understood that the words used are words of description rather than of limitation, and that changes within the purview of the appended claims may be made without departing from the true scope and spirit of the invention in its broader aspects.

What is claimed is:

1. An oscillator comprising a direct current source, a plurality of saturable magnetic transformer cores, forward and reverse driver circuits, each of said driver circuits comprising a switching means and substantially identical windings on each core serially connected across said current source, the windings of each driver circuit being arranged to magnetize each core in a direction opposite to the magnetization produced by the other driving circuit, switch windings in the input circuit of each switching means, said switch windings being oriented on the magnetic cores so as to render the associated switching means conductive when current through that switching means is increasing, individual biasing means for establishing a different level of initial magnetization in each core, said biasing means being further adjusted to bias one core to saturation, and output means comprising further windings on each of said cores, said further windings being serially connected between sets of output terminals.

2. An oscillator comprising a plurality of saturable magnetic transformer cores having essentially identical characteristics, individually controllable magnetic biasing means for each core, said biasing means being adjusted to provide initial biasing forces which differ in successive cores by an amount equal to twice the magnetizing force necessary for saturation, one of said biasing means being further adjusted to bias the associated core to saturation, a first current switching means, a first driving means connected to said first switching means and magnetically coupled to each core so as to change the magnetizing force applied to all cores concurrently in the same forward direction when the first switching means is rendered conductive, a second current switching means, a second driving means connected to said second switching means and magnetically coupled to each core so as to change the magnetizing force applied to all cores concurrently in the same reverse direction when the second switching means is rendered conductive, switch windings in the input circuit of each switching means, said switch windings being coupled to the magnetic cores so as to increase the conductivity of the switching means with increasing positive rate of change of current flow through the switching means, individual output windings coupled to each core, and a pair of output terminals, said output terminals and said output windings being connected in a series relationship.

3. An oscillator comprising:

(a) a plurality of magnetic transformer cores, (b) a forward and a reverse driving circuit for providing oppositely directed magnetizing forces in each of said cores, each of said driving circuits including a switching means, a first driver winding magnetically coupled to a first core, and a second driver winding magnetically coupled to a second core, said first and second driver windings being connected in series relationship with the output of the associated switching means, (c) separate first and second switch windings connected in series relationship with the input of each switching means, said first switch winding being magnetically coupled to the same core as the corresponding first driver winding and being oriented to provide a voltage that increases the conductivity of the associated switching means when the current in the output circuit of the switching means is increasing, said second switch winding being magnetically coupled to the same core as the second driver winding, (d) biasing means, said biasing means including individual biasing windings magnetically coupled to each core, and individual current controlling means to energize each coil so as to permit each core to be biased to a different level, and (e) output means including a pair of output terminals, and an output winding on each core connected in serial relationship with the output terminals.

4. A device as described in claim 3 in which the biasing means for successive cores are adjusted to provide increments of magnetizing force equal to twice the value necessary to saturate a core.

5. The device describe in claim 4 wherein one core is biased to saturation.

6. The device described in claim 5 wherein said first and said second cores are each biased to saturation.

7. A source of synchronously related signals comprising a plurality of transformer cores; a forward and a reverse switching element; a forward and a reverse driver winding on each core, each of said forward and each of said reverse driver windings being connected serially in the output of said forward and said reverse switching elements respectively, said forward and said reverse driver windings on each core being oriented so as to produce oppositely directed magnetizing forces when energized through said switching means; a forward and a reverse switch winding wound on each core, each of said forward and each of said reverse switch windings being connected serially in the input of said forward and said reverse switching elements respectively, each switch winding on each core being wound oppositely to the corresponding driver winding on that core; individually controllable biasing means coupled to each core, each of said biasing means being adjusted to magnetize each core at least to saturation; a first output circuit, said circuit including output coils wound on each core and connected in a series aiding relationship; and a second output circuit, said circuit including output coils wound on each core and having a first of said coils connected in series opposition to a second of said coils.

8. The device described in claim 7 further including an output circuit having first and second output windings; a full wave rectifier connected to each output winding; a bridge resistor; a pair of of intermediate terminals; means connecting similarly polarized terminals of the rectifiers associated with said first output windings to one end of the bridge resistor; means connecting the terminals of the rectifiers associated with the second output windings to the opposite end of the bridge resistor and the opposite intermediate terminal from those to which the corresponding first output windings and the associated rectifier terminals are connected.

9. An oscillator comprising:

(a) first and second magnetic cores, (b) first biasing means adjusted to bias the first core to saturation in the downward direction, (c) second biasing means adjusted to bias the second core to saturation in the upward direction, (d) first and second switching means for varying the magnetization in the first and second magnetic cores respectively, (e) first and second serially connected forward driver windings coupled to said first and second magnetic cores respectively, said first and second forward driver windings being connected to said first switching means so as to provide upwardly directed magnetizing forces to each core when said switching means is rendered conductive, (f) first and second serially connected reverse driver windings coupled to said first and second magnetic cores respectively, said first and second reverse driver windings being connected to said second switching means so as to provide downwardly directed magnetizing forces to each core when said switching means is rendered conductive, (g) first and second switch windings connected in the input circuit of each switching means, each of said first switch windings being magnetically coupled to the core with which its corresponding switching means is associated so as to increase the conductivity of the switching means when the current through this switching means is increasing, (h) first and second output windings coupled to said first and second magnetic cores respectively, and (i) output terminals connected in series relationship with said first and second output windings.

References Cited by the Examiner

UNITED STATES PATENTS

| | | | |
|---|---|---|---|
| 2,873,371 | 2/1959 | Van Allen | 308—88.5 |
| 2,917,696 | 12/1959 | Michaels | 321—2 |
| 2,994,788 | 8/1961 | Clark | 807—88.5 |

MILTON O. HIRSHFIELD, *Primary Examiner.*

LLOYD McCOLLUM, ROBERT L. SIMS, *Examiners.*